United States Patent [19]

Yokoi et al.

[11] Patent Number: 4,956,317

[45] Date of Patent: Sep. 11, 1990

[54] WHISKER-REINFORCED CERAMICS

[75] Inventors: Hitoshi Yokoi, Ama; Masakazu Watanabe, Nagoya; Akiyasu Okuno, Kani; Satoshi Iio, Konan, all of Japan

[73] Assignee: NGK Spark Plug Co., Ltd., Aichi, Japan

[21] Appl. No.: 277,374

[22] Filed: Nov. 29, 1988

[30] Foreign Application Priority Data

Dec. 1, 1987 [JP] Japan ................. 62-303829
May 25, 1988 [JP] Japan ................. 63-127687

[51] Int. Cl.$^5$ ............................. C04B 35/58
[52] U.S. Cl. ........................ 501/92; 501/95; 501/97; 501/98
[58] Field of Search ............ 501/92, 95, 97, 98

[56] References Cited

U.S. PATENT DOCUMENTS

| | | | |
|---|---|---|---|
| 3,833,389 | 9/1974 | Komeya et al. | 501/92 |
| 4,506,021 | 3/1985 | Jack et al. | 501/98 |
| 4,789,277 | 12/1988 | Rhodes et al. | 501/89 X |
| 4,795,724 | 1/1989 | Soma et al. | 501/98 |
| 4,801,564 | 1/1989 | Baba | 501/92 |

OTHER PUBLICATIONS

Lundberg et al., "SiC-Whisker-Reinforced Si$_3$N$_4$ Composites", Am. Ceram. Soc. Bull., 66[2] 330-33 (1987).

*Primary Examiner*—Karl Group
*Attorney, Agent, or Firm*—Wegner & Bretschneider

[57] ABSTRACT

Whisker-reinforced ceramics with high fracture toughness and strength consists essentially of 5-40 weight % SiC including SiC whiskers, 1-30 weight % of at least one kind of oxides of elements selected from the group consisting of Al, Sc, Y and rare-earth elements, and the balance being silicon oxynitride constituents, wherein said SiC whiskers are present in an amount of no less than 5 weight % of the total essential constituents.

The silicon oxynitride constituents are Si$_2$N$_2$O or a mixture of silicon nitride and silica (0.83-1.22 by molar ratio), or a mixture of Si$_2$N$_2$O and said mixture of silicon nitride and silica. Silicon oxynitride and SiC phases are predominant.

57 Claims, No Drawings

WHISKER-REINFORCED CERAMICS

BACKGROUND

This invention relates to whisker-reinforced ceramics consisting essentially of silicon oxynitride ($Si_2N_2O$) reinforced by SiC whiskers.

Recently, there is a need for ceramic materials which have high strength and high toughness and also have excellent resistibilities against abrasion, chipping, oxidation and heat, used for cutting tools, automobile engine parts, such as ceramic valves or the like, and heat engine parts, such as gas turbine rotors or the like.

As a ceramic material which has excellent oxidation resistance and heat resistance, there is known silicon oxynitride. There are also known such that SiC powder is added to $Si_3N_4$ and $SiO_2$, and the resultant mixture is sintered to obtain ceramic materials having high-temperature strength (for example, Japanese Patent-Kokai Publication No. 54-123110 (1979)), or that $CeO_2$ is added to $Si_3N_4$ and $SiO_2$ to obtain high-strength sintered bodies of silicon oxynitride (Annual Meeting of Ceramic Society of Japan; Preprint 3A25).

SUMMARY OF THE DISCLOSURE

However, although conventional sintered bodies of silicon oxynitride described above have excellent heat resistance and oxidation resistance and also have high strengths, they do not have enough toughness.

It is an object of the present invention to provide a novel sintered ceramic body which has high heat resistance, high oxidation resistance, high strength and yet more high toughness. The present invention has adopted the following means for solving the above-described object.

According to the present invention there is provided a whisker-reinforced ceramics consisting essentially of 5–40% by weight of SiC including SiC whiskers, 1–30% by weight of at least one kind of oxides of the elements selected from the group consisting of Al, Sc, Y and rare-earth elements, and the balance being silicon oxynitride constituents, wherein said SiC whiskers are present in an amount of no less than 5% by weight of the total essential constituents.

DETAILED DESCRIPTION OF THE PREFERRED EMBODIMENTS

The term "silicon oxynitride constituents" means silicon oxynitride or a mixture of silicon nitride and silica in the defined proportion, or a mixture of silicon oxynitride and thus mixture. The defined proportion of silicon nitride to silica is 0.83–1.22, preferably 1.0 by molar ratio. Above 1.22 the presence of excessive silica will result in excessive amount of glass phases which lead to decrease in the strength at a high temperature. Below 0.83 the desired predominant oxynitride phase cannot yield in the sintered ceramics, i.e., an integral strength ratio (defined lateron) of X-ray diffraction spectra peaks exceeds ½.

Here, usual commercial SiC whiskers can be used, the typical shape of which is 0.2–5 μm in the average diameter and 2–200 μm in the average length. Especially, whisker-like crystals in which there are few cation constituents, such as Al, Ca, Mg, Ni, Fe, Co, Mn, Cr or the like, and there are also few neckings, branchings, surface defects or the like, are preferable. There may also be coating of 8N, carbon or the like on the surfaces of the SiC whiskers.

In the present invention, toughness is insufficient when the SiC whiskers are less than 5% by weight of the total essential constituents. Further, when SiC including SiC whiskers is less than 5% by weight, the decomposition of silicon oxynitride at sintering cannot be suppressed, and there is also no improvement in toughness due to SiC whiskers. On the other hand, when SiC exceeds 40 weight %, sinterability becomes inferior, and so desired fiber-reinforced ceramics cannot be obtained. When SiC including SiC whiskers is 10–30% (most preferably 15–30%) by weight, especially toughness is excellent, and sinterability is also excellent. The SiC whiskers may be present at 5–40%. Preferably, the SiC whiskers are 10–30% (most preferably 15–30%) by weight of the entire essential constituents. Namely, when SiC including SiC whiskers consists of only SiC whiskers and the whiskers are 15–30% by weight of the entire essential constituents, the most excellent toughness and sinterability are achieved. SiC powders and/or platelets may be present in an amount of 0–35% by weight, however such presence is not preferred.

When at least one kind or two or more kinds of oxides of the elements selected from the group consisting of Al, Sc, Y and rare-earth elements are less than 1 weight %, sinterability becomes inferior, and desired whisker-reinforced ceramics cannot be obtained. On the other hand, when the oxides exceed 30 weight %, glass components in the whisker-reinforced ceramics become excessive, and strength, heat resistance and oxidation resistance decrease. Preferred amount of the oxides is 1–20% (most preferably 1–10%) by weight. Preferred amount of the oxides is 1–20% (most preferably 1–10%) by weight. Oxides of elements of Al, Sc, Y, La, Ce, Nd, Sm, Dy and/or Yb are preferred (most preferred are Al, Y, La, Ce, Nd and/or Yb). The rare-earth elements include lanthanides (atomic numbers 57 La–71 Lu).

It is to be noted that when $Al_2O_3$ is selected as an oxide, there is no problem even if a part of the total of $Al_3O_3$ makes solid solution in silicon oxynitride of the sintered body obtained, and becomes $Si_{2-x}AL_xO_{1+x}N_{2-x}$ (O'-sialon), where x is $0 \leq x \leq 0.2$.

Other than the above-described essential constituents, beta-$Si_3N_4$ or alpha-$Y_2Si_2O_7$ or the like may also be contained up to such an extent as not affecting the properties. Preferably, the sum of silicon oxynitride and SiC is predominant over a silicon nitride phase (e.g., beta-silicon nitride, or other phase like alpa-$Y_2Si_2O_7$). It is preferred that the silicon oxynitride phase present is in the sintered ceramics in an amount defined by an integral strength ratio of X-ray diffraction spectra peaks of a strongest peak of beta-$Si_3N_4$ (either one of (101) and (210) peaks) relative to a strongest peak of silicon oxynitride (either one of (200) and (111) peaks), the ratio being no more than ½ (preferably no more than ⅓). Generally, silicon oxynitride rapidly decomposes at a temperature range over 1700° C. by the reaction

In the present invention, however, since SiC suppresses the decomposition of silicon oxynitride at sintering, and at the same time at least one kind of oxides of the elements selected from the group consisting of Al, Sc, Y and rare-earth elements promote the sintering of silicon oxynitride, it is possible to obtain sufficiently dense whisker-reinforced ceramics. Further, the presence of SiC whiskers in the sintered bodies provides high toughness to the whisker-reinforced ceramics.

Moreover, in the whisker-reinforced ceramics of the present invention, the grain growth of silicon oxynitride during the sintering is suppressed, and a sintered body having high strength is obtained. The sintering may be effected preferably at a temperature range of 1700–1850° C. under the conditions such that can densify compacts up to a density of at least 96% (preferably 98%) of the theoretical density. Application of pressure, like hot press method, during the sintering is preferred, e.g., under a pressure of 20–50 MPa. The sintering may be done by keeping said temperature range for a half hour or more, preferably for one to four hours. The atmosphere in which the sintering is conducted is not particularly limited, however, a nonoxidizing atmosphere is preferred.

By the above-described constitution, the present invention can provide a ceramic material which has high strength, high toughness, and also has excellent resistibilities against abrasion, chipping, oxidation and heat.

It will be noted that it is already known that the toughness of alumina, mullite or the like is improved by the addition of SiC whiskers, but the addition of SiC whiskers is not necessarily increase the toughness of ceramics. For example, even when SiC whiskers are added to $Si_3N_4$ which has a composition similar to that of the present invention, only a slight improvement in toughness can be observed, and no remarkable improvement as in the present invention cannot be observed.

Also it should be noted that besides the essential constituents, there may be a certain amount of inevitable impurities although their presence is not preferred.

As exemplified hereinbelow, the present invention can provide a whisker-reinforced ceramics having following particular features and properties;

|   |   | preferably | most preferably |
|---|---|---|---|
| (1) Flexural strength, room temp. MPa 1000° C. | ≧686, ≧588, | ≧735 ≧637 | ≧784 ≧686 |
| (2) fracture toughness MPam$^{\frac{1}{2}}$ | ≧5.5, | ≧6 | ≧7 |
| (3) hardness Hv GPa | ≧16.2, | ≧16.7 | ≧17.2 |
| (4) density relative to the theoretical | ≧96%, | ≧98% | — |
| (5) average grain size of longer diameter (of silicon oxynitride) | ≦15 μm, | ≦8 μm | — |

The oxides of Sc, Y and rare-earth elements will partly form glass phases and partly form crystalline phases, e.g., $RE_2Si_2O$ (where RE represents rare-earth elements). $Al_2O_3$ partly forms glass phases. Like SiC whisker, SiC powders do not react with other constituents through the sintering and remain in the sintered ceramic body.

Now, the embodiments of the present invention will be explained.

EXAMPLE 1

The starting materials shown hereafter were mixed in the ratios shown in TABLE 1, and after uniformly dispersing and mixing in ethanol for 16 hours using a ball mill, the resultant mixtures were dried and granulated to obtain base powders.

Materials
$Si_3N_4$: alpha-$Si_3N_4$ fraction; 90%, average grain size; 0.6 μm, purity; 98%
$SiO_2$: average grain size; 15 nm, purity; 99.9%
$Si_2N_2O$: average grain size; 1 μm, purity; 95%
Oxides of Al, Sc, Y and rare-earth elements (indicated as oxide constituents in TABLE 1): average grain size; no larger than 2 μm
SiC powder: average grain size; 1.6 μm, purity; 96%
SiC whiskers: average grain size; 0.6 μm, length; 10–80 μm aspect ratio; 16–133

The base powders were sintered by hot pressing with temperatures, times and pressures shown in TABLE 1, and the sintered bodies thus obtained were processed by grinding wheel into samples having the dimensions of 4 mm×3 mm×40 mm.

Then, flexural strength (conforming to JIS-R1601 and JIS-R1604) of the samples at room temperature and 1000° C. were measured, and Vickers hardness (10 kgf load) and fracture toughness (the indentation microfracture method, 10 kgf load) were also measured. The results are shown in TABLE 1. Further, crystal phases in the samples were identified through X-ray diffractometry. The results are also shown in TABLE 1.

As a result of observation of the samples under a microscope, X-ray diffraction and quantitative analysis of carbon, it was also confirmed that SiC whiskers remain in the samples in the shape of whiskers without chemically reacting with other constituents.

The following conclusions have been obtained from TABLE 1.

1. When only constituents which form $Si_2N_2O$, or only $Si_2N_2O$ are used as raw materials, and oxide constituents and SiC whiskers are not used, as in Sample Nos. 1-A and 1-B, sintered bodies cannot be obtained.

2. When SiC whiskers are not used as in Sample Nos. 1-C and 1-D, sintering does not occur, because $Si_2N_2O$ constituents decompose and volatilize under the same conditions as in Examples. If sintered under different sintering conditions as is the case with Sample Nos. 1-E and 1-F, a sufficient fracture toughness cannot be obtained.

3. When SiC constituents (the sum of SiC powder and SiC whiskers) are less than 5 weight % as in Sample Nos. 1-G and 1-H, it is impossible to suppress the decomposition and volatilization of $Si_2N_2O$, and satisfactory sintered bodies cannot be obtained. When SiC constituents are more than 40 weight % as in Sample Nos. 1-I and 1-J, sinterability becomes inferior, and sufficiently sintered bodies cannot be obtained.

4. When the oxide constituents are not used as in Sample Nos. 1-K and 1-L, there is no generation of glass phases during sintering, and sintering is not promoted. Further, when oxide constituents are less than 1 weight % as in Sample Nos. 1-M and 1-N, the generation of glass phases during the sintering is in a small amount, and the sintering does not progress. On the contrary, when oxide constituents are more than 30 weight % as in Sample Nos. 1-O and 1-P, too much glass phases are generated, and sintered bodies having satisfactory properties cannot be obtained.

5. When SiC whiskers are less than 5 weight % as in Sample Nos. 1-Q and 1-R, sintered bodies having high toughness cannot be obtained even if other constituents are within the range of the present invention.

Note the inequality mark ">" in the Tables represents that the integral strength ratio of the strongest peak of beta-$Si_3N_4$ to the strongest peak of $Si_2N_2O$ is ½ or less.

EXAMPLE 2

The materials used in Example 1 were mixed with ratios shown in TABLE 2, and the resultant mixtures were sintered to prepare samples, and the samples were evaluated in the same way as in Example 1.

The following conclusions have been obtained from TABLE 2.

6. When the content of SiC whiskers are no less than 5 weight % of the total, sintered bodies having excellent properties can be obtained.

That is, as is apparent from the above-described items 1 through 6, a whisker-reinforced ceramics consisting essentially of 5–40 weight % SiC, 1–30 weight % of oxide constituents and the balance being silicon oxynitride constituents, wherein SiC whiskers are present in an amount of no less than 5 weight % of the total essential constituents, can be an excellent ceramic materials which has high strength and high toughness, and at the same time has excellent properties against abrasion, chipping, oxidation and heat.

Throughout the examples the sintering experiments were conducted primarily at 1750° C. As for the comparative examples note that those examples which had decomposed and evaporated at 1750° C. were sintered at a lower temperature while those which had not been densified at 1750° C. were sintered at a higher temperature to obtain measurable sintered speciments.

It should be noted that the present invention is not limited to the disclosed embodiments and any modification in the art may be done without departing from the gist of the present invention as read in the entire context of the disclosure and the scope defined in the claims.

TABLE 1-1

| | Mixing composition (weight %) | | | | | | Sintering conditons | | |
|---|---|---|---|---|---|---|---|---|---|
| | $Si_2N_2O$[*1] | | | | SiC | | | | |
| Sample No. | $Si_3N_4$ | $SiO_2$ | (Molar ratio) | Oxide constituents | | Whiskers | Powder | Temp. (°C.) | Time (Hr) | Pressure[*2] |
| Examples | | | | | | | | | | |
| 1-1 | 64.3 | 27.5 | (1.00) | $Sc_2O_3$ | 3.2 | 5 | — | 1750 | 1 | 200 |
| 1-2 | 63.5 | 22.9 | (1.00) | $Y_2O_3$ | 8.6 | 15 | — | 1750 | 1 | 200 |
| 1-3 | — | — | 61.2 | $Y_2O_3$ | 13.8 | 25 | — | 1750 | 2 | 200 |
| 1-4 | — | — | 37.4 | $La_2O_3$ | 27.6 | 35 | — | 1800 | 2 | 300 |
| 1-5 | 45.8 | 16.4 | (1.20) | $La_2O_3$ | 17.8 | 20 | — | 1750 | 1 | 300 |
| 1-6 | 39.8 | 20.5 | (0.83) | $CeO_2$ | 14.7 | 25 | — | 1750 | 1 | 200 |
| 1-7 | 59.9 | 23.4 | (1.10) | $CeO_2$ | 6.7 | 10 | — | 1780 | 1 | 200 |
| 1-8 | — | — | 83.0 | $Nd_2O_3$ | 7.0 | 10 | — | 1780 | 1 | 200 |
| 1-9 | 48.5 | 17.0 | (1.22) | $Sm_2O_3$ | 14.5 | 20 | — | 1750 | 3 | 200 |
| 1-10 | 46.0 | 21.7 | (0.91) | $Dy_2O_3$ | 12.3 | 20 | — | 1750 | 1 | 200 |
| 1-11 | — | — | 94.0 | $CeO_2$ | 1.0 | 5 | — | 1750 | 3 | 200 |
| 1-12 | — | — | 55.0 | $CeO_2$ | 30.0 | 15 | — | 1750 | 1 | 200 |
| 1-13 | 47.5 | 20.3 | (1.00) | $La_2O_3$ | 22.2 | 5 | 5 | 1750 | 2 | 300 |
| 1-14 | 31.7 | 13.6 | (1.00) | $La_2O_3$ | 14.7 | 20 | 20 | 1750 | 2 | 300 |
| 1-15 | — | — | 85.6 | $Al_2O_3$ | 2.4 | 12 | — | 1750 | 2 | 300 |
| 1-16 | 51.4 | 20.0 | (1.10) | $Al_2O_3$ | 5.6 | 23 | — | 1750 | 2 | 300 |

| | Properties of the sintered body | | | | |
|---|---|---|---|---|---|
| | Flexural[*3] strength | | Fracture toughness | Vickers hardness Hv (kgf/mm³) | Crystal phases in the[*5] sintered body |
| Sample No. | Room temp. | 1000° C. | | | |
| Examples | | | | | |
| 1-1 | 75 | 72 | 5.8 | 1720 | $Si_2N_2O$,SiC |
| 1-2 | 81 | 73 | 6.3 | 1800 | $Si_2N_2O$,SiC>β-$Si_3N_4$ |
| 1-3 | 80 | 65 | 7.1 | 1750 | $Si_2N_2O$,SiC>β-$Si_3N_4$,α-$Y_2Si_2O_7$ |
| 1-4 | 98 | 73 | 8.3 | 1840 | $Si_2N_2O$,SiC>β-$Si_3N_4$,U.K. |
| 1-5 | 83 | 77 | 7.5 | 1800 | $Si_2N_2O$,SiC>β-$Si_3N_4$,U.K. |
| 1-6 | 87 | 74 | 7.6 | 1730 | $Si_2N_2O$,SiC>β-$Si_3N_4$,U.K. |
| 1-7 | 77 | 76 | 7.2 | 1760 | $Si_2N_2O$,SiC>β-$Si_3N_4$ |
| 1-8 | 79 | 76 | 6.9 | 1790 | $Si_2N_2O$,SiC>β-$Si_3N_4$ |
| 1-9 | 96 | 88 | 7.8 | 1770 | $Si_2N_2O$,SiC>β-$Si_3N_4$,U.K. |
| 1-10 | 89 | 80 | 7.7 | 1830 | $Si_2N_2O$,SiC>β-$Si_3N_4$,U.K. |
| 1-11 | 72 | 82 | 6.8 | 1780 | $Si_2N_2O$,SiC |
| 1-12 | 81 | 61 | 7.4 | 1740 | $Si_2N_2O$,SiC>β-$Si_3N_4$,U.K. |
| 1-13 | 74 | 63 | 6.6 | 1750 | $Si_2N_2O$,SiC>β-$Si_3N_4$,U.K. |
| 1-14 | 87 | 72 | 7.4 | 1810 | $Si_2N_2O$,SiC>β-$Si_3N_4$,U.K. |
| 1-15 | 73 | 78 | 7.3 | 1740 | $Si_2N_2O$,SiC |
| 1-16 | 78 | 76 | 7.8 | 1790 | $Si_2N_2O$,SiC>β-$Si_3N_4$ |

1 kgf/mm² = 9.8 MPa
1 kgf/cm² = 9.8 × 10⁴ Pa

Note
[*1] ( ) shows the molar ratio of $Si_3N_4$ powder to $SiO_2$ powder in the raw material
[*2] The unit of pressure in the sintering conditions is (kgf/cm²)
[*3] The unit of flexural strength in properties of the sintered body is (kgf/mm²)
[*4] The unit of fracture toughness in properties of the sintered body is (MPam^½)

TABLE 1-2

| | Mixing composition (weight %) | | Sintering conditions |
|---|---|---|---|
| | $Si_2N_2O$[*1] | SiC | |

TABLE 1-2-continued

| Sample No. | Si₃N₄ | SiO₂ | (Molar ratio) | Oxide constituents | | Whiskers | Powder | Temp. (°C.) | Time (Hr) | Pressure*2 |
|---|---|---|---|---|---|---|---|---|---|---|
| Comparative Examples | | | | | | | | | | |
| 1-A | 70.0 | 30.0 | (1.00) | — | — | 0 | — | 1750 | 2 | 200 |
| 1-B | — | — | 100.0 | — | — | 0 | — | 1750 | 2 | 200 |
| 1-C | 64.4 | 27.6 | (1.00) | Sm₂O₃ | 8.0 | 0 | — | 1750 | 2 | 200 |
| 1-D | — | — | 92.0 | Sm₂O₃ | 8.0 | 0 | — | 1750 | 2 | 200 |
| 1-E | 64.4 | 27.6 | (1.00) | Sm₂O₃ | 8.0 | 0 | — | 1680 | 4 | 200 |
| 1-F | — | — | 92.0 | Sm₂O₃ | 8.0 | 0 | — | 1680 | 4 | 200 |
| 1-G | 62.4 | 26.7 | (1.00) | Y₂O₃ | 7.9 | 3 | — | 1750 | 1 | 200 |
| 1-H | — | — | 89.1 | Y₂O₃ | 7.9 | 3 | — | 1750 | 1 | 200 |
| 1-I | 32.8 | 14.1 | (1.00) | CeO₂ | 8.1 | 45 | — | 1800 | 2 | 200 |
| 1-J | — | — | 46.9 | CeO₂ | 8.1 | 45 | — | 1800 | 2 | 200 |
| 1-K | 59.5 | 25.5 | (1.00) | — | — | 15 | — | 1750 | 2 | 200 |
| 1-L | — | — | 85.0 | — | — | 15 | — | 1750 | 2 | 200 |
| 1-M | 55.6 | 23.9 | (1.00) | Dy₂O₃ | 0.5 | 20 | — | 1750 | 2 | 200 |
| 1-N | — | — | 79.5 | Dy₂O₃ | 0.5 | 20 | — | 1750 | 2 | 200 |
| 1-O | 32.9 | 14.1 | (1.00) | Nd₂O₃ | 38.0 | 15 | — | 1750 | 2 | 200 |
| 1-P | — | — | 47.0 | Nd₂O₃ | 38.0 | 15 | — | 1750 | 2 | 200 |
| 1-Q | 40.0 | 17.1 | (1.00) | Y₂O₃ | 12.9 | — | 30 | 1750 | 2 | 200 |
| 1-R | — | — | 57.1 | Y₂O₃ | 12.9 | 2 | 28 | 1750 | 2 | 200 |

| | Properties of the sintered body | | | | |
|---|---|---|---|---|---|
| | Flexural*3 strength | | Fracture toughness | Vickers hardness Hv (kgf/mm³) | Crystal phases in the*5 sintered body |
| Sample No. | Room temp. | 1000° C. | | | |
| Comparative Examples | | | | | |
| 1-A | Not densified | | | | β-Si₃N₄ |
| 1-B | Decomposed and volatilized | | | | |
| 1-C | Decomposed and volatilized | | | | |
| 1-D | Decomposed and volatilized | | | | |
| 1-E | 42 | 29 | 2.8 | 1420 | Si₂N₂O>α-Si₃N₄ |
| 1-F | 37 | 30 | 2.5 | 1390 | Si₂N₂O |
| 1-G | Decomposed and volatilized | | | | |
| 1-H | Decomposed and volatilized | | | | |
| 1-I | Not densified | | | | Si₂N₂O,SiC |
| 1-J | Not densified | | | | Si₂N₂O,SiC |
| 1-K | Not densified | | | | β-Si₃N₄,SiC |
| 1-L | Not densified | | | | Si₂N₂O,SiC |
| 1-M | Not densified | | | | β-Si₃N₄,SiC>Si₂N₂O |
| 1-N | Not densified | | | | Si₂N₂O,SiC |
| 1-O | 69 | 31 | 7.0 | 1500 | Si₂N₂O,SiC>β-Si₃N₄,U.K. |
| 1-P | 73 | 27 | 6.8 | 1450 | Si₂N₂O,SiC>β-Si₃N₄,U.K. |
| 1-Q | 59 | 62 | 3.0 | 1680 | Si₂N₂O,SiC>β-Si₃N₄ |
| 1-R | 63 | 63 | 3.5 | 1670 | Si₂N₂O,SiC>β-Si₃N₄ |

1 kgf/mm² = 9.8 MPa
1 kgf/cm² = 9.8 × 10⁴ Pa

Note
*1( ) shows the molar ratio of Si₃N₄ powder to SiO₂ powder in the raw material
*2The unit of pressure in the sintering conditions is (kgf/cm²)
*3The unit of flexural strength in properties of the sintered body is (kgf/mm²)
*4The unit of fracture toughness in properties of the sintered body is (MPam^½)
*5U.K. indicates unknown crystal phase

TABLE 2

| | Mixing composition (weight %) | | | | | Sintering conditions | | |
|---|---|---|---|---|---|---|---|---|
| | | | Oxide | | SiC | Temperature | Time | |
| Sample No. | Si₃N₄ | SiO₂ | constituents | | Whiskers | Powder | (°C.) | (Hr) | Pressure*6 |
| Examples | | | | | | | | | |
| 2-1 | 47.7 | 20.4 | CeO₂ | 11.9 | 20 | — | 1750 | 2 | 200 |
| 2-2 | 47.7 | 20.4 | CeO₂ | 11.9 | 15 | 5 | 1750 | 2 | 200 |
| 2-3 | 47.7 | 20.4 | CeO₂ | 11.9 | 10 | 10 | 1750 | 2 | 200 |
| 2-4 | 47.7 | 20.4 | CeO₂ | 11.9 | 5 | 15 | 1750 | 2 | 200 |
| Comparative Examples | | | | | | | | | |
| 2-A | 47.7 | 20.4 | CeO₂ | 11.9 | — | 20 | 1750 | 2 | 200 |
| 2-B | 46.0 | 19.0 | — | — | — | 35 | 1750 | 2 | 200 |
| 2-C | 67.0 | 28.0 | — | — | — | 5 | 1750 | 2 | 200 |

| | Properties of the sintered body | | | | |
|---|---|---|---|---|---|
| | Flexural strength*7 | | Fracture*8 toughness | Vickers hardness Hv (kgf/mm²) | Crystal phases in the sintered body |
| Sample No. | Room temperature | 1000° C. | | | |
| Examples | | | | | |
| 2-1 | 82 | 75 | 7.9 | 1740 | Si₂N₂O,SiC>β-Si₃N₄ |
| 2-2 | 79 | 65 | 7.4 | 1740 | Si₂N₂O,SiC>β-Si₃N₄ |

TABLE 2-continued

| | | | | | |
|---|---|---|---|---|---|
| 2-3 | 73 | 64 | 6.9 | 1700 | $Si_2N_2O, SiC > \beta\text{-}Si_3N_4$ |
| 2-4 | 68 | 59 | 6.2 | 1690 | $Si_2N_2O, SiC > \beta\text{-}Si_3N_4$ |
| Comparative Examples | | | | | |
| 2-A | 41 | 33 | 3.2 | 1690 | $Si_2N_2O, SiC > \beta\text{-}Si_3N_4$ |
| 2-B | | Not densified | | | $\beta\text{-}Si_3N_4, SiC$ |
| 2-C | | Not densifed | | | $\beta\text{-}Si_3N_4, SiC$ |

$1 \text{ kgf/mm}^2 = 9.8 \text{ MPa}$
$1 \text{ kgf/cm}^2 = 9.8 \times 10^4 \text{ Pa}$ Note
*6 The unit of pressure in the sintering conditions is (kgf/cm$^2$)
*7 The unit of flexural strength in properties of the sintered body is (kgf/mm$^2$)
*8 The unit of fracture toughness in properties of the sintered body is (MPam$^{\frac{1}{2}}$)

What is claimed is:

1. A whisker-reinforced ceramic consisting esentially of 5–40 weight % SiC including SiC whiskers, 1–30 weight % of at least one oxide of elements selected from the group consisting of Al, Sc, Y and rare earth elements, and the balance being silicon oxynitride constituents, wherein said SiC whiskers are present in an amount of no less than 5 weight % of the total ceramic.

2. The whisker-reinforced ceramic as defined in claim 1, wherein said silicon oxynitride constituents are $Si_2N_2O$ or a mass resulting from sintering a mixture of silicon nitride and silica or from sintering a mixture of $Si_2N_2O$ and said mixture of silicon nitride and silica.

3. The whisker-reinforced ceramic as defined in claim 2, wherein said mixture of silicon nitride and silica has a molar ratio of silicon nitride to silica of 0.83 –1.22.

4. The whisker-reinforced ceramics as defined in claim 1, wherein said elements are Al, Sc, Y, La, Ce, Nd, Sm and Dy.

5. The whisker-reinforced ceramics as defined in claim 1, wherein said elements are Al, Y, La, Ce, Nd and Yb.

6. The whisker-reinforced ceramics as defined in claim 1, wherein the sum of silicon oxynitride and SiC is predominant over silicon nitride phase in the ceramics.

7. The whisker-reinforced ceramic as defined in claim 1, which has a fracture toughness of 5.5 MPam$^{\frac{1}{2}}$ or more.

8. The whisker-reinforced ceramic as defined in claim 7, which has a flexural strength at room temperature of 686 MPa or more and at 1000° C. of 588 MPa or more.

9. The whisker-reinforced ceramic as defined in claim 7, which has a vickers hardness Hv of 16.2 GPa or more.

10. The whisker-reinforced ceramics as defined in claim 1, which has a relative density of 96% or more of the theoretical density.

11. The whisker-reinforced ceramics as defined in claim 1, which has silicon oxynitride grains with an average grain size in terms of longer diameter of no more than 15 μm.

12. The whisker-reinforced ceramic as defined in claim 5, wherein the silicon oxynitride is present in an amount defined by an integral strength ratio of X-ray diffraction spectra peaks of a strongest peak of beta-silicon nitride relative to a strongest peak of silicon oxynitride, said ratio being no more than $\frac{1}{4}$.

13. The whisker-reinforced ceramic as defined in claim 9, which has been sintered at a temperature range of 1700–1850° C.

14. The whisker-reinforced ceramic as defined in claim 7, which has a fracture toughness of 6 MPam$^{\frac{1}{2}}$ or more.

15. The whisker-reinforced ceramic as defined in claim 14, which has a flexural strength at room temperature of 735 MPa or more and at 1000° C. of 637 MPa or more.

16. The whisker-reinforced ceramic as defined in claim 14, which has a vickers hardness Hv of 16.7 GPa or more.

17. The whisker-reinforced ceramic as defined in claim 10, which has a relative density of 98% or more of the theoretical density.

18. The whisker-reinforced ceramics as defined in claim 11, which has silicon oxynitride grains with an average grain size in terms of longer diameter of no more than 8 μm.

19. The whisker-reinforced ceramic as defined in claim 12, wherein the silicon oxynitride is present in an amount defined by an integral strength ratio of X-ray diffraction spectra peaks of a strongest peak of beta-silicon nitride relative to a strongest peak of silicon oxynitride, said ratio being no more than $\frac{1}{4}$.

20. A whisker-reinforced ceramic consisting essentially of 5–40 weight % SiC including SiC whiskers, 1–30 weight % of alumina and optionally oxides of elements selected from the group consisting of Sc, Y and rare earth elements, and the balance being silicon oxynitride constituents, wherein said SiC whiskers are present in an amount of no less than 5 weight % of the total ceramic and wherein at least some of the alumina and silicon oxynitride constituents have reacted to form O'-sialon.

21. The whisker-reinforced ceramic as defined in claim 20, wherein said silicon oxynitride constituents are $Si_2N_2O$ or a mass resulting from sintering a mixture of silicon nitride and silica or from sintering a mixture of $Si_2N_2O$ and said mixture of silicon nitride and silica.

22. The whisker-reinforced ceramic as defined in claim 21, wherein said mixture of silicon nitride and silica has a molar ratio of silicon nitride to silica of 0.83–1.22.

23. The whisker-reinforced ceramic as defined in claim 20, wherein said rare earth elements are selected from the group consisting of La, Ce, Nd, Sm and Dy.

24. The whisker-reinforced ceramic as defined in claim 20, wherein said rare earth elements are selected from the group consisting of La, Ce, Nd and Yb.

25. The whisker-reinforced ceramic as defined in claim 20, wherein the sum of silicon oxynitride and SiC is predominant over silicon nitride phase in the ceramics.

26. The whisker-reinforced ceramic as defined in claim 20, which has a fracture toughness of 5.5 MPam$^{\frac{1}{2}}$ or more.

27. The whisker-reinforced ceramic as defined in claim 26, which has a flexural strength at room temperature of 686 MPa or more and at 1000° C. of 588 MPa or more.

28. The whisker-reinforced ceramic as defined in claim 26, which has a vickers hardness Hv of 16.2 GPa or more.

29. The whisker-reinforced ceramic as defined in claim 20, which has a relative density of 96% or more of theoretical density.

30. The whisker-reinforced ceramic as defined in claim 20, which has silicon oxynitride grains with an average grain size in terms of longer diameter of no more than 15 μm.

31. The whisker-reinforced ceramic as defined in claim 24, wherein the silicon oxynitride is present in an amount defined by an integral strength ratio of x-ray diffraction spectra peaks of a strongest peak of beta-silicon nitride relative to a strongest peak of silicon oxynitride, said ratio being no more than ¼.

32. The whisker-reinforced ceramic as defined in claim 28, which has been sintered at a temperature range of 1700–1850° C.

33. The whisker-reinforced ceramic as defined in claim 26, which has a fracture toughness of 6 MPam½ or more.

34. The whisker-reinforced ceramic as defined in claim 33, which has a flexural strength at room temperature of 735 MPa or more and at 1000° C. of 637 MPa or more.

35. The whisker-reinforced ceramic as defined in claim 33, which has a vickers hardness Hv of 16.7 GPa or more.

36. The whisker-reinforced ceramic as defined in claim 29, which has a relative density of 98% or more of theoretical density.

37. The whisker-reinforced ceramic as defined in claim 30, which has silicon oxynitride grains with an average grain size in terms of longer diameter of no more than 8 μm.

38. The whisker-reinforced ceramic as defined in claim 31, wherein the silicon oxynitride is present in an amount defined by an integral strength ratio of x-ray diffraction spectra peaks of a strongest peak of beta-silicon nitride relative to a strongest peak of silicon oxynitride, said ratio being no more than ¼.

39. A whisker-reinforced ceramic consisting essentially of 5–40 weight % SiC including SiC whiskers, 1–30 weight % of at least one oxide of elements selected from the group consisting of Sc, Y and rare earth elements, and the balance being silicon oxynitride constituents, wherein said SiC whiskers are present in an amount of no less than 5 weight % of the total ceramic.

40. The whisker-reinforced ceramic as defined in claim 39, wherein said silicon oxynitride constituents are $Si_2N_2O$ or a mass resulting from sintering a mixture of silicon nitride and silica or from sintering a mixture of $Si_2N_2O$ and said mixture of silicon nitride and silica.

41. The whisker-reinforced ceramic as defined in claim 40, wherein said mixture of silicon nitride and silica has a molar ratio of silicon nitride to silica of 0.83–1.22.

42. The whisker-reinforced ceramic as defined in claim 39, wherein said rare earth elements are selected from the group consisting of La, Ce, Nd, Sm and Dy.

43. The whisker-reinforced ceramic as defined in claim 39, wherein said rare earth elements are selected from the group consisting of La, Ce, Nd and Yb.

44. The whisker-reinforced ceramic as defined in claim 39, wherein the sum of silicon oxynitride and SiC is predominant over silicon nitride phase in the ceramics.

45. The whisker-reinforced ceramic as defined in claim 39, which has a fracture toughness of 5.5 MPam½ or more.

46. The whisker-reinforced ceramic as defined in claim 45, which has a flexural strength at room temperature of 686 MPa or more and at 1000° C. of 588 MPa or more.

47. The whisker-reinforced ceramic as defined in claim 45, which has a vickers hardness Hv of 16.2 GPa or more.

48. The whisker-reinforced ceramic as defined in claim 39, which has a relative density of 96% or more of theoretical density.

49. The whisker-reinforced ceramic as defined in claim 39, which has silicon oxynitride grains with an average grain size in terms of longer diameter of no more than 15 μm.

50. The whisker-reinforced ceramic as defined in claim 43, wherein the silicon oxynitride is present in an amount defined by an integral strength ratio of x-ray diffraction spectra peaks of a strongest peak of beta-silicon nitride relative to a strongest peak of silicon oxynitride, said ratio being no more than ¼.

51. The whisker-reinforced ceramic as defined in claim 47, which has been sintered at a temperature range of 1700–1850° C.

52. The whisker-reinforced ceramic as defined in claim 45, which has a fracture toughness of 6 MPam½ or more.

53. The whisker-reinforced ceramic as defined in claim 52, which has a flexural strength at room temperature of 735 MPa or more and at 1000° C. of 637 MPa or more.

54. The whisker-reinforced ceramic as defined in claim 52, which has a vickers hardness Hv of 16.7 GPa or more.

55. The whisker-reinforced ceramic as defined in claim 48, which has a relative density of 98% or more of theoretical density.

56. The whisker-reinforced ceramic as defined in claim 49, which has silicon oxynitride grains with an average grain size in terms of longer diameter of no more than 8 μm.

57. The whisker-reinforced ceramic as defined in claim 50, wherein the silicon oxynitride is present in an amount defined by an integral strength ratio of x-ray diffraction spectra peaks of a strongest peak of beta-silicon nitride relative to a strongest peak of silicon oxynitride, said ratio being no more than ¼.

* * * * *